Aug. 7, 1934.     J. MIHALYI     1,969,471

MOTION PICTURE FILM MOVING MECHANISM

Filed May 4, 1932

Inventor:
Joseph Mihalyi,
Newton N. Perrins,
Donald H. Stewart,
By
Attorneys

Patented Aug. 7, 1934

1,969,471

UNITED STATES PATENT OFFICE 1,969,471

MOTION PICTURE FILM MOVING MECHANISM

Joseph Mihalyi, Rochester, N. Y., assignor to Eastman Kodak Company, Rochester, N. Y., a corporation of New York Application May 4, 1932, Serial No. 609,081

10 Claims. (Cl. 271—2.3)

This invention relates to photography and more particularly to motion picture machines adapted to move a perforated motion picture film by means of sprocket teeth engaging the perforations. One object of my invention is to provide a cooperating sprocket and film guide which are immovably located with respect to each other and which will hold film securely on the sprocket teeth and at the same time permit film to be threaded between the sprocket and roller. Another object of my invention is to provide a sprocket and roller with cooperating film engaging flanges so arranged that film may be entered between a pair of the film engaging flanges. Another object of my invention is to provide a roller for cooperating with a sprocket, the roller being provided with spaced film engaging flanges separated by a cut away portion which permits a film to be threaded edge-wise between the sprocket and roller. Still another object of my invention is to provide cooperating film engaging rollers and sprocket, there being film guideways extending between pairs of film engaging rollers, and other objects will appear from the following specification, the novel features being particularly pointed out in the claims at the end thereof.

Coming now to the drawing wherein like reference characters denote like parts throughout, Fig. 1 is a side elevation of a typical motion picture camera having a cooperating sprocket and film rollers constructed in accordance with and embodying a preferred form of my invention.

While it is quite obvious that my invention can be applied to any machine in which a perforated film band is moved by means of a sprocket and is held in position against the sprocket by film guiding rollers, it is particularly suitable for use on small motion picture cameras and projectors which must be inexpensively made.

Figure 1:
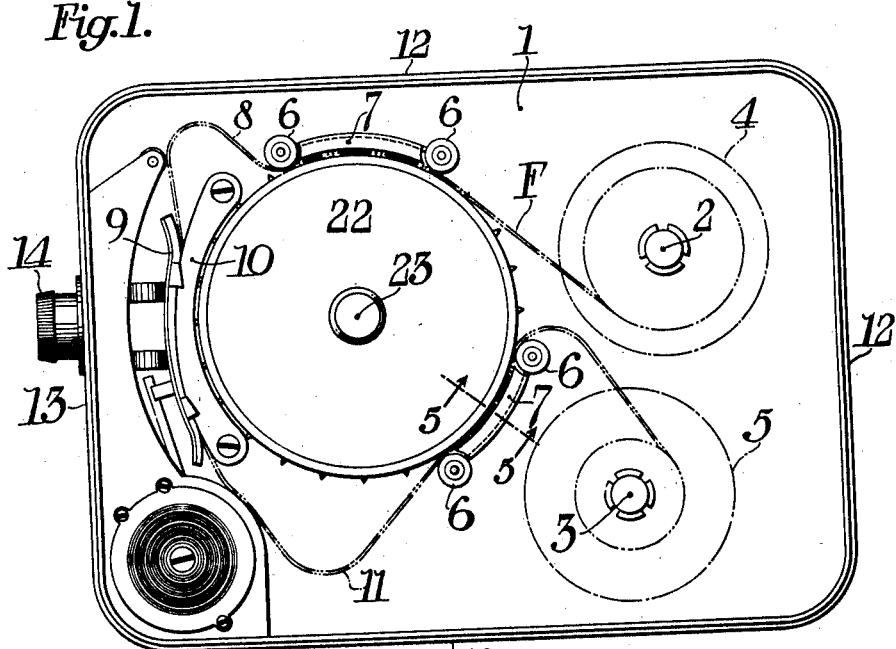

In Fig. 1 a typical small "amateur" motion picture camera is indicated as having its door opened as for loading. The camera may consist of a mechanism plate 1 carrying the usual film supporting posts 2 and 3 on which reels 4 and 5 of film may be placed. Film is led from a supply reel 4 underneath the film engaging rollers 6 which may be connected by a film guide 7 and the film F is then looped at 8 passing through a gate comprising a movable member 9 and a fixed member 10, is looped at 11 and is then passed under a second pair of film engaging rollers 6 connected by a film guide 7, after which the film may be threaded upon a take-up reel 5. The camera may have the usual side walls 12 and on a front wall 13 an objective may be mounted in the housing 14. Except for the relation of the sprocket and the film pressing rollers, this camera may be of any standard construction.

Figure 4:
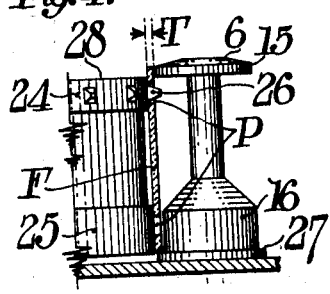
Fig. 4 is a view similar to Fig. 3 but with the film completely entered into a film guiding position.

The film engaging rollers 6, as best shown in the fragmentary detail views, may consist of a pair of spaced film engaging flanges 15 and 16 and having a cut away portion 17 between these flanges and a tapered portion 18 leading up to the lowermost film engaging flange 16. As indicated in Fig. 4, the film engaging flanges 15 and 16 are spaced apart a distance sufficient to contact with only the extreme edges of the film F. In other words, the outer edges of the film engaging flanges are spaced apart substantially the same distance as the width of the film F. The roller 6 is preferably mounted to turn freely upon a post 19 which may be supported by the mechanism plate 1.

Figure 5:
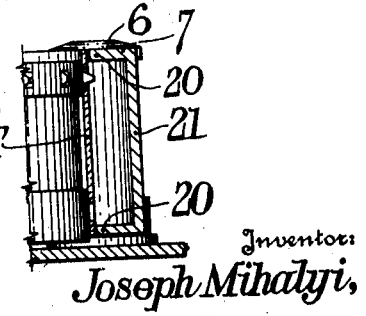
Fig. 5 is an enlarged fragmentary detail on line 5—5 of Fig. 1.

As indicated in Fig. 1 the film engaging rollers are preferably provided in pairs and these pairs of rollers are preferably connected by means of a film guideway 7 which, as indicated in Fig. 5 is substantially U-shaped in cross section, with ends 20 of the U-shaped member being adapted to contact with the extreme edges of the film and the central portion 21 of the U-shaped member connecting the two edges. It should be noted that the film engaging guides 20 are spaced toward the extreme edges of a film.

The film sprocket 22 may be mounted to turn upon a central post 23, this sprocket being also provided with a pair of spaced film engaging flanges 24 and 25. The flange 24 is preferably provided with sprocket teeth 26 and the flange 25 is preferably free from such teeth.

The sprocket 22, as best indicated in Fig. 4, is of less width than the width of the film F and between the film engaging flange 24 of the sprocket and 15 of the roller there lies an opening of a width somewhat greater than the thickness T of the film F, the sprocket teeth 26 extending beneath the film engaging flange 15.

Figure 2:
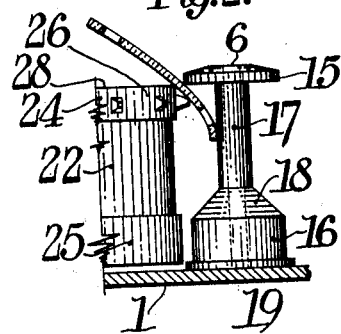
Fig. 2 is an enlarged fragmentary side elevation showing the relation of a portion of the film sprocket and a cooperating roller as indicated in Fig. 1.
Figure 3:
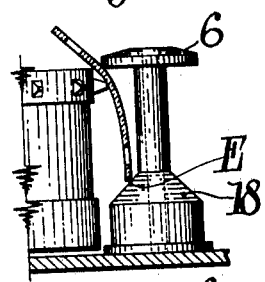
Fig. 3 is a view similar to Fig. 2 but with a film partially entered into the operative position.

Since the film engaging rollers cannot be moved with respect to the sprocket 22 it is necessary to enter a film between the roller and sprocket to move it into an operative position in which the sprocket teeth 26 engage the perforations P in the film. To do this the film F is started as indicated in Fig. 2 by thrusting one edge of the film through the opening between the off-set film engaging flanges 15 and 24. The film being held in a curved position is slid downwardly as indicated in Fig. 3 until the lower edge E of the film strikes the beveled portion 18 of the rollers which cams the lower edge between the film engaging flanges 25 and 16. The downward movement of the film is limited as shown in Fig. 4 by the flange 27. When the film has been completely entered between the roller 6 and the sprocket 22 it lies in the position shown in Fig. 4 in which the extreme upper edge of the film extends up beyond the upper edge 28 of the sprocket.

As indicated in Fig. 5, when the film is entered between the film engaging rollers 6 and the sprocket 22, it is also entered between the film guiding flanges 20 which tend to hold the film smoothly curving around the periphery of the sprocket in contact with the driving teeth.

With a film moving device arranged as above described, the lower edge of the film is firmly guided by means of the cooperating film engaging flanges 16 and 25 which are preferably spaced slightly further apart than the thickness of the film. The upper edge of the film, however, is not guided in the same way since the cooperating film engaging flanges 15 and 24 are off-set with respect to each other, flange 15 lying so as to engage the extreme edge of one side of the film, and flange 24 being off-set so as to engage an area adjacent the edge spaced from that portion which is engaged by flange 15. The spaced film engaging flanges 15 and 24 allow a film to be entered between them for the purpose of threading, but when the film has been placed in operative position they cooperate to hold the film properly on the sprocket teeth 26. The curvature of the film being pressed against the periphery of sprocket 22 tends to prevent the film from buckling across its length.

A film driving sprocket provided with cooperating film guiding rollers and flanges constructed in accordance with the above described invention is simple in construction since it requires no moving parts and is easily operated in practice.

What I claim as my invention and desire to be secured by Letters Patent of the United States is:

1. In a perforated motion picture film feeding device, the combination with a sprocket having teeth thereon said sprocket being of less width than the width of a film, a fixedly mounted flanged roller spaced from the sprocket a distance slightly greater than the thickness of a film, said roller being of greater width than said sprocket and having a flange spaced from the sprocket teeth, lying beyond the edge of said sprocket and including a cut away area lying opposite said sprocket teeth whereby film may be slid edgewise between said sprocket and roller.

2. In a perforated motion picture film feeding device, the combination with a sprocket having teeth thereon said sprocket being of less width than the width of a film, a fixedly mounted flanged roller spaced from the sprocket a distance slightly greater than the thickness of a film, said roller being of greater width than said sprocket, film engaging flanges on the sprocket and roller defining between them a path for one side of the film, one flange on the roller being positioned beyond the end of said sprocket, and film engaging flanges on opposite sides of the sprocket and roller and spaced from each other defining a path for the opposite side of the film, whereby a film may be inserted between the spaced film engaging flanges at the point where the roller flange extends beyond the end of the sprocket.

3. In a perforated motion picture film feeding device, the combination with a sprocket of definite width having film engaging flanges and teeth, of a fixedly mounted roller of greater width than said sprocket, a pair of film engaging flanges on said roller spaced differently from the sprocket film engaging flanges one roller flange being positioned beyond the flange on said sprocket there being a cut away portion between said roller flanges into which the teeth of said sprocket project, the film engaging flanges on one side of the sprocket and roller being offset a distance sufficient to allow a film to be threaded edgewise between said sprocket teeth and said roller.

4. In a perforated motion picture film feeding device, the combination with a sprocket having film engaging flanges and teeth of a fixedly mounted roller of greater width than the sprocket, a pair of film engaging flanges on said roller, the film engaging flanges on one side of the sprocket and roller lying directly opposite each other to guide both sides of one film edge, the film engaging flanges on the other side of said sprocket and roller being spaced axially apart whereby one will guide the extreme edge of a film and the other will guide a portion of the film adjacent said edge.

5. In a perforated motion picture film feeding device, the combination with a sprocket and roller of greater width than the sprocket adapted to guide a film, of two film engaging flanges on the sprocket and roller, one pair lying opposite each other and being adapted to engage opposite sides of a film, the other pair of film engaging flanges lying spaced axially from each other whereby one flange may guide one area of the film and the other flange will guide an adjacent film area.

6. In a perforated motion picture film feeding device, the combination with a sprocket and roller of greater width than the sprocket adapted to guide a film, of two film engaging flanges on the sprocket and roller, one pair lying opposite each other and being adapted to engage opposite sides of a film, the other pair of film engaging flanges lying spaced axially from each other whereby one flange may guide one area of the film and the other flange will guide an adjacent film area and a cut away portion between the film engaging flanges of the roller providing a space for inserting a film edgewise between the axially spaced film engaging flanges of the sprocket and roller.

7. In a perforated motion picture film feeding device, the combination with cooperating film engaging and moving devices comprising a sprocket of less width than a film, a pair of spaced film engaging flanges thereon, a roller at least as wide as the film, a pair of spaced film engaging flanges thereon, said flanges being of substantially the same width as the film, one film engaging flange on the sprocket and roller being offset axially with respect to each other, said roller film engaging flanges terminating in a cut away portion whereby a film may be entered edgewise between the axially offset sprocket and roller flanges and moved through the cut away portion of the roller into a position defined by the four film engaging flanges.

8. In a perforated motion picture film feeding device, the combination with a sprocket having teeth thereon, of a pair of spaced film rollers of greater width than the sprocket, film engaging flanges carried by the rollers in spaced relation with cut away portions therebetween, and a pair of arcuate shaped film guiding rails spaced from each other and extending between the film guiding flanges of the pair of rollers and adapted to guide the edges of a film.

9. In a perforated motion picture film feeding device, the combination with a sprocket having teeth thereon, of a pair of spaced film rollers of greater width than the sprocket, film engaging flanges carried by the rollers in spaced relation with cut away portions therebetween, and a pair of arcuate shaped film guiding rails spaced from each other and extending between the film guiding flanges of the pair of rollers and adapted to guide the edges of a film at least one of the arcuate film guiding rails lying close to the teeth on said sprocket, but being spaced therefrom a distance sufficient for the film to pass between the teeth and film guiding flange.

10. In a perforated motion picture film feeding device, the combination with a sprocket having teeth thereon, of a pair of spaced film rollers of greater width than the sprocket, film engaging flanges carried by the rollers in spaced relation with cut away portions therebetween, and a pair of arcuate shaped film guiding rails spaced from each other and extending between the film guiding flanges of the pair of rollers and adapted to guide the edges of a film, said film guiding rails being connected together at their edges spaced from the film.

JOSEPH MIHALYI.